United States Patent
Furlette et al.

[15] 3,642,121
[45] Feb. 15, 1972

[54] CONVEYOR MECHANISM

[72] Inventors: James L. Furlette, Flint; Donald A. Stadler, Fenton, both of Mich.

[73] Assignee: Excel Corporation, Fenton, Mich.

[22] Filed: July 23, 1970

[21] Appl. No.: 57,727

[52] U.S. Cl.............................................................198/219
[51] Int. Cl........................................................B65g 25/04
[58] Field of Search..................................................198/219

[56] References Cited

UNITED STATES PATENTS

| | | | |
|---|---|---|---|
| 1,343,373 | 6/1920 | Pedersen | 198/219 |
| 2,184,915 | 12/1939 | Gray | 198/219 |
| 3,511,369 | 5/1970 | Chilton | 198/219 |

*Primary Examiner*—Richard E. Aegerter
*Attorney*—Hauke, Gifford and Patalidis

[57] ABSTRACT

A conveyor mechanism for continuously, simultaneously conveying articles along a horizontal path. The conveyor mechanism has a plurality of transversely spaced movable beams driven by a plurality of longitudinally spaced parallel shafts rotated in a timed relation. Each shaft is provided with transversely spaced slots of a predetermined depth and so arranged that each successive slot is longitudinally aligned with each successive movable beam. A plurality of rollers, spaced below the beams, support the beams to prevent contact between the beams and the rotating shafts when the beams are within the shaft slots. The beams are elevated to a predetermined position and move in a first direction when engaged by the nonslotted portions of the rotating shafts, and are lowered to engage and be supported by the rollers and moved in an opposite direction when the beams are within the shaft slots. The slotted portions of the rotating shafts are preferably arranged so that at least one pair of beams is always in an elevated position so that workpieces conveyed thereby will always be supported in a common plane by beams moving in the same direction. The driving means between the beams and the rotating shafts for moving the beams in the first direction take the form of a frictional drive in one embodiment and of a positive gear-to-rack drive in another embodiment. The drive means between the beams and the rollers to move the beams in the opposite direction may selectively take the form of mechanical springs, a frictional drive or a positive gear-to-rack drive.

25 Claims, 13 Drawing Figures

INVENTORS
JAMES L. FURLETTE
DONALD STADLER

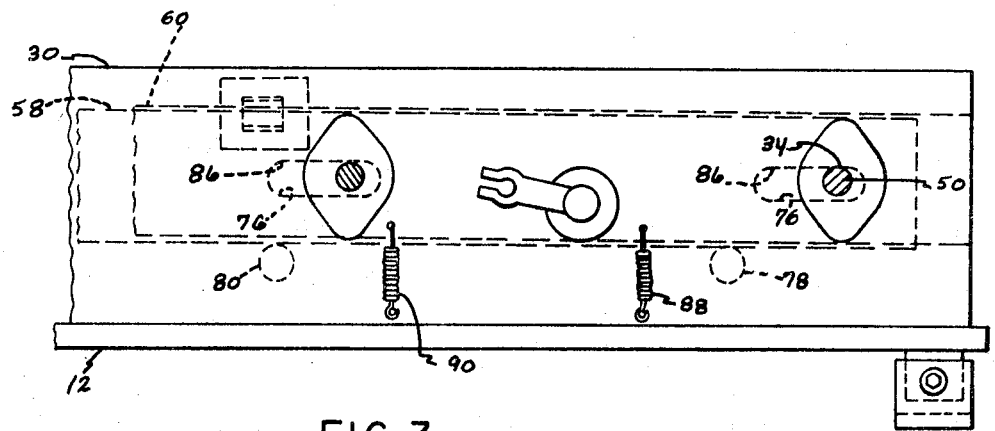
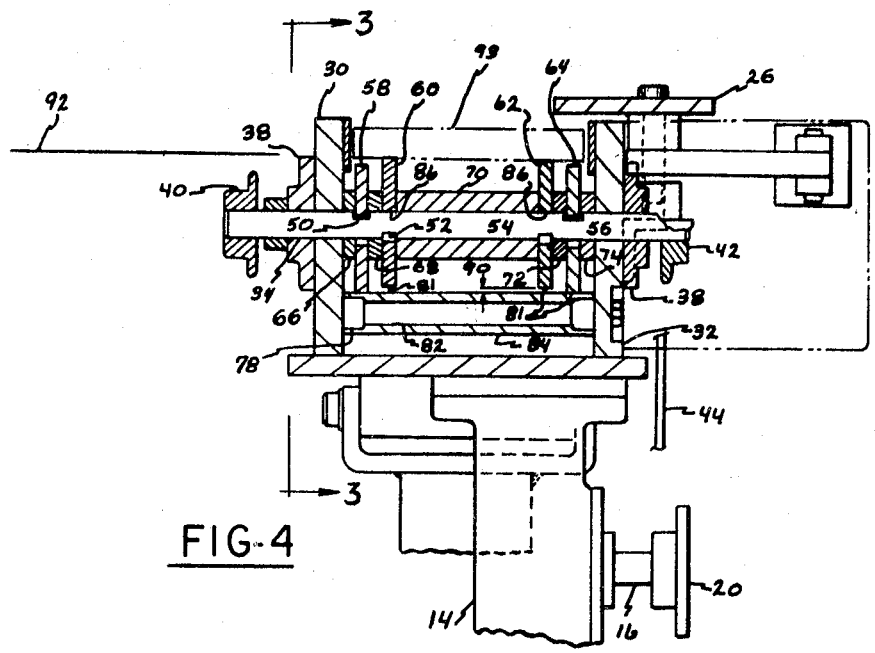
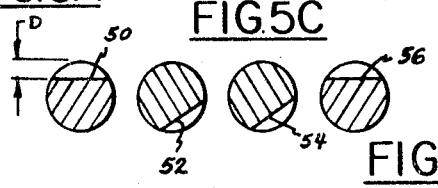

PATENTED FEB 15 1972 3,642,121

INVENTORS
JAMES L. FURLETTE
DONALD STADLER
BY
*Hauke Gifford & Pataldi*
*Attorneys*

CONVEYOR MECHANISM

BACKGROUND OF THE INVENTION

1. Field of the Invention

The present invention relates to conveyor mechanisms and particularly to a mechanism adapted to transfer articles along a horizontal path.

2. Description of the Prior Art

Heretofore, numerous driving mechanisms have been employed to simultaneously transfer a plurality of articles in succession along a defined path. One such conveyor mechanism is of the walking-beam type which consists of a pair of fixed, substantially horizontal supports and a pair of movable horizontal supports for vertically raising workpieces resting on the horizontal fixed supports, moving the workpieces a predetermined distance substantially parallel with the horizontal supports, and then lowering the workpieces vertically onto the horizontal supports. The movable supports return to their initial starting position and subsequently reengage the workpieces, so as to move a plurality of workpieces from point to point in succession along the horizontal supports. In such walking-beam conveyor mechanisms special problem are encountered if any substantial speed in conveying the articles in succession is desired as each article must be accelerated from its resting position, first upward after the article has been engaged by the movable supports, and then forward to its next position. Prior to being received in the next position, the article must be decelerated to stop the forward motion of the movable supports, and finally the movable supports must be lowered to set the article in its next successive location in its movement along the horizontal path defined by the fixed horizontal supports, all of which must be done in a very precise manner so that any given point on the article to be transferred will follow a rectangular path accurately aligned with the several support members of the previously used walking-beam conveyor mechanism.

Such previously used walking-beam conveyor mechanisms require a complicated drive mechanism in order to accurately move the articles to be transferred, thus are very expensive to manufacture. Further, because such walking-beam conveyor mechanisms are of a complex nature, they are not reliable and may lead to a considerable downtime and increase the overall cost of the product using such a conveyor mechanism and its manufacture.

It is desirable to provide a conveyor mechanism of the walking-beam type which will simultaneously convey articles along a fixed horizontal path without the need of raising and lowering of the article being transferred, thereby eliminating the need of the complicated drive mechanisms heretofore required.

SUMMARY OF THE INVENTION

The present invention, which will be described subsequently in greater detail, comprises a conveyor mechanism of the walking-beam type for simultaneously conveying articles along a defined horizontal path. The conveyor mechanism comprises a longitudinal supporting frame having a plurality of longitudinally spaced parallel shafts rotatably carried thereby, each of the shafts in turn having transversely spaced slots of a predetermined depth at predetermined arcuate locations on the periphery of the shafts, the slots on each successive shaft being longitudinally aligned. A plurality of transversely spaced, movable support beams are successively aligned with each of the successively aligned slots of the shafts. The shafts are rotated in such a manner that the aligned slots move in a timed relation, such that a nonslotted portion of the outer periphery of the shafts engages some of the beams to elevate them and move them in one direction, while the other beams are vertically displaced to a lower position within the slots of the shafts. A plurality of longitudinally spaced rollers are engaged by and support the lowered beams and are so spaced from the shafts as to prevent the movable beams from contacting the rotating shafts when the beams are within the shaft slots. Suitable means are provided for moving the beams in an opposite direction when they are in the shaft slots, whereby the beams alternately follow a generally rectangular path, the upper surface of the beams engaging and supporting articles to move them along a horizontal path. A portion of the elevated beams are always in contact with the article being moved, whereby a smooth uninterrupted, horizontal motion is imparted to them.

It is therefore an object of the present invention to provide a conveyor mechanism for imparting smooth, simultaneous, uninterrupted motion to articles along a defined common horizontal path.

It is a further object of the present invention to provide such a conveyor mechanism which is dependable, rugged, compact, uncomplicated, relatively inexpensive and involving no undue maintenance and service.

Other objects, advantages, and applications of the present invention will become apparent to those skilled in the art of conveyor mechanisms when the accompanying description of several embodiments of the best modes contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and in which:

FIG. 3 is a fragmentary, partially cross-sectional side elevational view of the conveyor mechanism illustrated in FIG. 1 and taken generally along line 3—3 of FIG. 4;

FIG. 4 is a cross sectional view of the conveyor mechanism taken along line 4—4 of FIG. 2;

FIGS. 5A, 5B, 5C and 5D are cross-sectional views illustrating the relative positions of the drive shaft components of the conveyor mechanism of FIG. 4;

DESCRIPTION OF THE PREFERRED EMBODIMENTS

Figure 1:
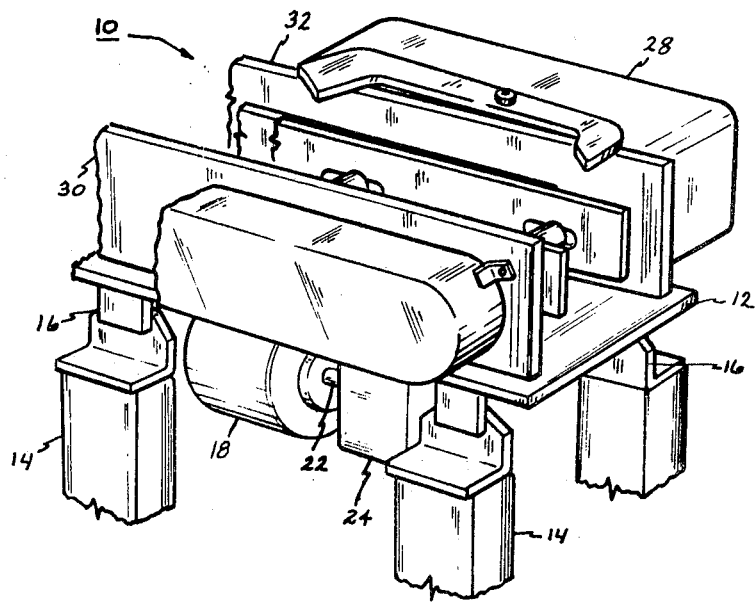
FIG. 1 is a perspective fragmentary view of a conveyor mechanism incorporating the present invention.

Referring to the drawings and particularly FIGS. 1-4, one example of the present invention is illustrated in the form of a conveyor mechanism 10 having a longitudinal support 12 mounted in a horizontal plane on stationary legs 14 by any suitable means such as bracket assemblies 16. The lower side of the support 12 carries an electric drive motor 18 having an output shaft 22 coupled to a gearbox 24 which, in turn, has an output shaft 16 carrying a pulley 20. An article advance control mechanism, generally indicated by the numeral 26 is attached to support 12 and enclosed by a cover 28. The article advance control mechanism 26 is well known in the art of such advance control mechanisms and a further detailed description herein is not necessary as such an advance control mechanism forms no part of the present invention.

The support 12 includes a pair of longitudinally disposed, parallel, upright sidewalls 30 and 32, the latter of which supports the article advance control mechanism 26.

Figure 2:
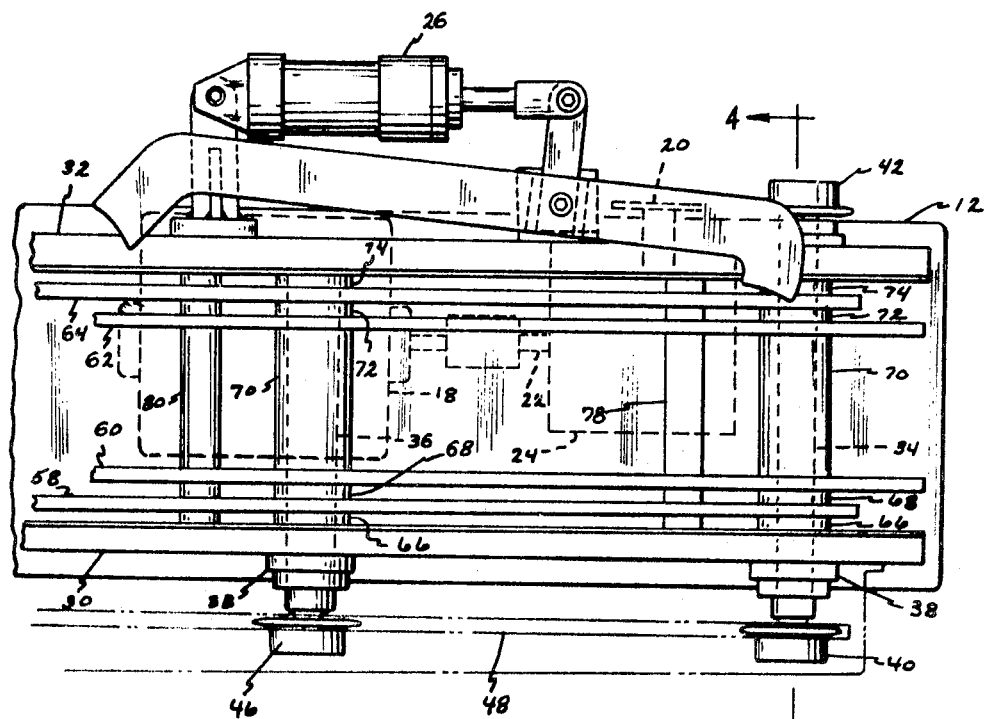
FIG. 2 is a fragmentary top plan view of the conveyor mechanism illustrated in FIG. 1 with portions thereof removed for clarity.

As can best be seen in FIGS. 2 and 4, the upright sidewalls 30 and 32 rotatably support a pair of shafts 34 and 36 by any suitable means such as bearings 38. Shaft 34 extends outwardly from the opposite sidewalls 30 and 32 with the opposite ends of the shaft 34 carrying pulleys 40 and 42. The shaft 34 is rotated by a belt 44 which connects pulley 42 to the output pulley 20 of the gearbox 24. Shaft 36 has a pulley 46 driven by a belt 48 which in turn is driven by the pulley 40. The output pulley 20 drives both shafts 34 and 36 at the same rotational speed.

Each shaft 34 and 36 has slots 50, 52, 54 and 56 which are successively, longitudinally aligned, and at the same annular position with respect to the longitudinal axis of their associated shaft. Thus, when the slots 52, 54 and 56 of the shaft 34 are in positions illustrated in FIG. 4, the slots 50, 52, 54 and 56 of the shaft 36 are in an identical angular position.

The slots 50 and 56 are transversely aligned on their respective shafts and arcuately displaced by a predetermined amount from transversely aligned slots 52 and 54. Each of the slots 50-56 is of a predetermined depth, indicated by the letter D in FIG. 5A, which depends upon the size of the several components of the conveyor mechanism 10 and will vary depending upon the desired application.

The conveyor mechanism 10 includes a plurality of longitudinally disposed, transversely spaced, movable support beams 58, 60, 62 and 64 which are respectively longitudinally aligned with the slots 50, 52, 54 and 56 of the shafts 34 and 36.

As can best be seen in FIG. 4, a plurality of spacers in the form of sleeves 66, 68, 70, 72 and 74 are provided around each shaft 34 and 36 to maintain the movable beams in proper alignment with their associated slots on each shaft. The sleeve spacers 66-74 are respectively disposed between the adjacent sidewalls of the upright sidewall 30, the movable beams 58-64 and the upright sidewall 32.

As can best be seen in FIG. 3, each movable beam has a longitudinal slotted portion 76 through which shafts 34 and 36 extend. The slotted portions 76 are of a predetermined length which normally extends the circumference of the shafts and which limits the amount of longitudinal movement of the beams, and of a width which exceeds the diameter of the shafts 34 and 36.

The conveyor mechanism 10 further includes a plurality of longitudinally spaced parallel rollers 78 and 80 disposed below the shafts 34 and 36. Each roller 78 and 80 includes a mounting shaft 82 supported at its opposite ends by the upright sidewalls 30 and 32 and an outer rubber sleeve 84 (FIG. 4). The lower surface 81 of each of the movable beams is adapted to engage the sleeve 84 of each of rollers 78 and 80 during selected periods of the operation of the conveyor mechanism to support the movable members and prevent contact between the upper surface 86 of the beam slotted portion 76 and their associated shafts.

A pair of lightweight mechanical springs 88 and 90 are connected to each of the movable beams at the bottom portions thereof and to the support 12 to bias the movable beams to the position shown in FIG. 3.

In the present embodiment, articles are transferred from left to right, as viewed in FIG. 3, when the motor 18 is actuated to drive the shafts 34 and 36 in a clockwise direction as again viewed in FIG. 3. As each of the shafts 34 rotate in a clockwise direction, the upper horizontal surface 86 of the slotted portion 76 in each beam will alternately be engaged by the outer periphery of the shaft and disengaged from the shaft as the slots 50, 52, 54 and 56 pass thereby. As the slots of the shafts 34 and 36 pass by the horizontal upper surface 86, the movable beams will be displaced a certain vertical distance downwardly into the slots of the shafts and when the surfaces 86 of each beam are engaged by the outer periphery of the shafts the movable beams will be elevated a certain vertical distance.

When the movable beams are in contact with the outer periphery of the shafts, the frictional engagement between the shafts and the horizontal surface 86 will impart a horizontal motion to the beam and displace the same a distance equal to the perimeter of the shafts, apart from the slots 50-54. When the slots 50-54 of the shafts pass under the horizontal surface 86 of each beam, the beams will drop downwardly into the slots, however, contact between the horizontal surface 86 and the bottom of the slots of the shafts is prevented by contact of the lower surface 81 of each movable beam with the rollers 78 and 80. Contact between the surface 86 and the bottom of each slot is prevented by positioning the rollers 78 and 80 such that the distance 90 (FIG. 4) between the lower surface 81 of each movable member and the outer periphery of the rollers 78 and 80 when the outer periphery of each shaft 34 and 36 is engaged with the horizontal surface 86 is less than the depth D of the slots 50-56 of the shafts 34 and 36.

When the movable beams 60 and 62, as illustrated in FIG. 4, are in contact with the outer periphery of the shafts 34 and 36 and the same have been elevated to a horizontal plane indicated by the numeral 92 to engage and convey an article 93, the other beams 58 and 64 are lowered vertically as the slots 50 and 56 pass thereunder. While the beams 58 and 64 are within the slots 50 and 56 and are engaged and supported by the rollers 78 and 80, the springs 88 and 90 bias the beams 58 and 64 leftwardly, as viewed in FIG. 3, back to their initial starting position. As the shafts 34 and 36 continue to rotate, the beams 58 and 64 will again contact the outer periphery of the shafts; be elevated into engagement with the article 93 and horizontally displaced by the frictional engagement between the movable beams 58 and 64 and their associated shafts. During a portion of the period of engagement of the beams 58 and 64 with the outer periphery of the shafts 34 and 36, the slots 52 and 54 will pass under the horizontal surfaces 86 of the beams 60 and 62, whereupon the beams 60 and 62 will be displaced vertically until the lower surface 81 thereof engages and are supported by the rollers 78 and 80, thereby disengaging from the article 93 at the same time the springs 88 and 90, associated with the movable beams 60 and 62, displace the beams 60 and 62 leftwardly to their initial starting position, whereupon the beams 60 and 62 are again engaged by the outer periphery of rotating shafts, elevated into contact with the article 93 and moved rightwardly to again impart a forward motion to the article 93. It can thus be seen that at all times at least two beams are in contact with the article 93 to convey the same. Thus, a continuous, smooth, uninterrupted motion is imparted to the article 93 to convey it along a path defined by the horizontal plane 92. The rate of forward movement of the article 93 can be varied by a number of factors: First, the speed of the motor 18 may be varied to either increase or decrease the rotation of the shafts 34 and 36, and thus control the rate of movement of the movable beams and thus the rate of forward movement of the article 93; Second, shafts 34 and 36 may be varied in their diametrical size which, in turn, will control both the speed and distance at which the movable beams move across the conveyor.

It should also be recognized that the conveyor mechanism 10 may be of any desired longitudinal length and may include any number of shafts 34 and 36. The length and number of shafts will depend upon the weight of the articles to be carried, which will vary from application to application.

Figure 6:
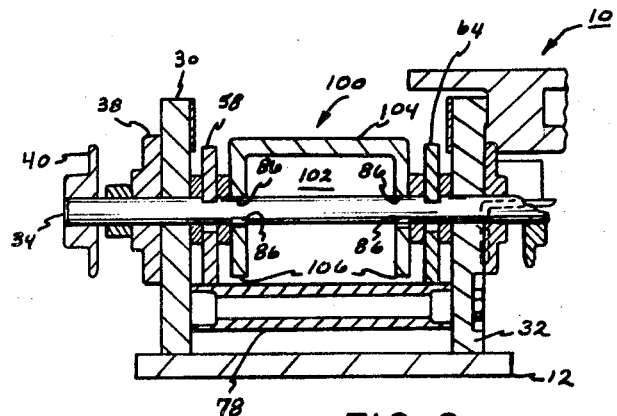
FIG. 6 is a fragmentary cross-sectional view similar to FIG. 4 illustrating a modification of the present invention.

Referring now to FIG. 6 wherein there is illustrated a modification to the conveyor mechanism 10 in which the movable support beams 60 and 62 have been replaced by a single centrally disposed movable beam 100. The movable beam 100 is of the tubular design having a hollow interior 102 and upper and lower surfaces 104 and 106, respectively. Each sidewall of the movable beam 100 has slotted portions 76 and shaft engaging surfaces 86 which function in an identical manner as hereinbefore described in the description of the embodiment disclosed in FIG. 1. The upper and lower surfaces 104 and 106 are respectively adapted to engage the article to be moved and the rollers 78 and 80. During operation of the conveyor, when the slots 50 and 56 associated with the beams 58 and 64 pass by the upper surface 86 of the movable beams 58 and 64, the same are displaced vertically downward while the entire upper surface 104 of the movable beam 100 is elevated to engage the article 93 to move the same forwardly. When the slots 42 and 54 associated with the movable beam 100 are rotated thereby, the entire centrally disposed movable beam 100 is vertically displaced until the lower surface 106 engages and is supported by the rollers, 78 and 80, while the springs 88 and 90 attached thereto displace the movable beam 100 back to its initial position. The outer periphery of the shafts 34 and 36 again engage the movable beam 100 to elevate the same to engage the article 93 and move the article 93 forwardly.

Figure 7:
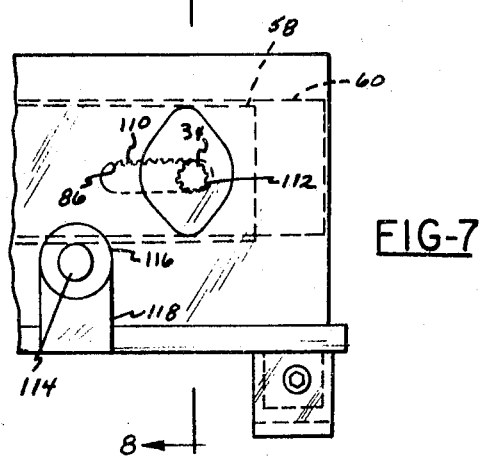
FIG. 7 is a fragmentary partially cross-sectional view of another modification of the conveyor mechanism illustrated in FIG. 1.
Figure 8:
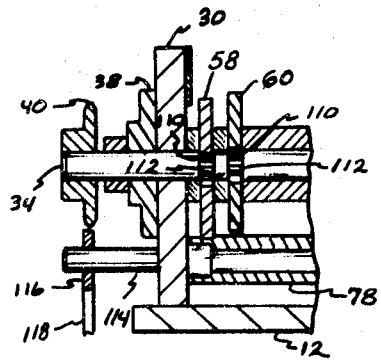
FIG. 8 is a fragmentary, partially cross-sectional view of the conveyor mechanism taken on line 8—8 of FIG. 7.

Referring to FIGS. 7 and 8 wherein there is illustrated another modification of the present invention in the form of the gear rack 110 formed on the upper horizontal surface 86 of the beam slotted portions 76. Gear teeth 112 are provided on the outer periphery of each shaft 34 and 36, apart from the slots 50-56, to provide a positive gear-to-rack drive for the beams when the same are elevated to engage the article 93. The rollers 78 and 80 may freely rotate, as illustrated in FIGS. 1-4, while the beams are returned by means of springs 88 and 90 or the rollers 78 and 80 may be positively rotated by means of a shaft extension 114, pulley 116 and belt 118 which are suitably connected to the electric motor drive 18 or the gearbox 24. Thus, as the rollers 78 and 80 are rotated, the frictional engagement between the rollers and the lower surface 81 of the movable beams back to their initial position.

Figure 9:
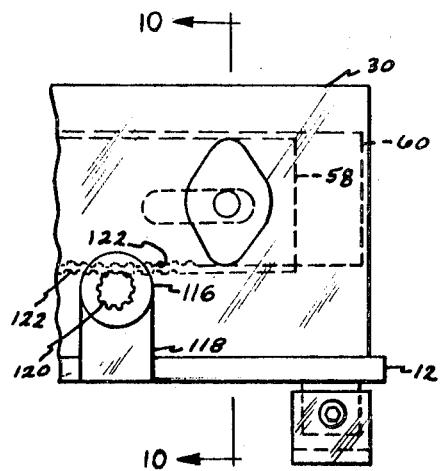
FIG. 9 is a fragmentary, partially cross-sectional view of another modification of the conveyor mechanism illustrated in FIG. 1.
Figure 10:
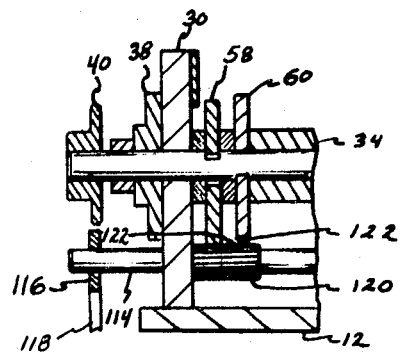
FIG. 10 is a fragmentary cross-sectional view of the conveyor mechanism taken along line 10—10 of FIG. 9.

FIGS. 9 and 10 illustrate a modification to the return mechanism in that, in addition to having the rollers 78 and 80 positively driven by means of the pulleys 116 and the belt 118, the rollers 78 and 80 have gear teeth 120 formed around the outer periphery thereof which are adapted to engage a gear rack 122 formed on the lower surfaces 81 of each of the movable beams, thereby providing a positive gear-to-rack drive for returning the movable beams back to their initial position while the same are within the slots 50-56.

Thus, it can be seen that the present invention has provided a conveyor mechanism for conveying an article in a smooth, uninterrupted manner along a defined horizontal path which is simple in its construction, dependable, compact, and relatively inexpensive in that it does not require a complicated drive mechanism as in the heretofore described conveyor mechanisms. It can also be seen that the present invention has eliminated the acceleration and deceleration loads that have heretofore been imposed upon the articles being transferred.

Although several modifications of the present invention have been shown in great detail, it is to be understood that other modifications may be had without departing from the spirit of the invention and the scope of the appended claims.

What is claimed as new and desired to be secured by Letters Patent of the United States is as follows:

1. A conveyor mechanism for conveying an article along a horizontal path, said conveyor mechanism comprising:
    a longitudinal support;
    a plurality of longitudinally spaced, parallel shafts rotatably carried by said support, each of said shafts having transversely spaced slots of a predetermined depth at predetermined arcuate locations around the periphery of said shafts, slots of each successive shaft being longitudinally aligned;
    means for rotating said shafts in a timed relation;
    a plurality of transversely spaced, movable support beams longitudinally aligned with said aligned slots, a portion of each beam engaging the outer peripheries of said shafts and driven from an initial position in a first direction, the upper surfaces of said beams being adapted to engage and move said article in said first direction when the beam portions engage the outer periphery of said rotating shafts, said beams being lowered into said slots as said slots rotate by said beam portions to lower said beam upper surfaces to disengage from said article;
    means for engaging and supporting said beams to prevent contact of said beams with said rotating shaft when said beams are lowered into said slots; and
    means for moving said beams in a direction opposite to said first direction to said initial position when said beams are in said slots.

2. The conveyor mechanism defined in claim 1 wherein each of said beams has a slotted portion associated with each shaft through and which each shaft extends, said beam slotted portions being of a predetermined longitudinal length and of a width greater than the diameter of their associated shafts, each of said beam slotted portions having an upper surface disposed in a horizontal plane and longitudinally aligned with the shaft slots of its associated shaft, said horizontal upper surfaces being engaged by the outer periphery of their associated shafts to elevate said beams into engagement with said article and to move said beams in said first direction.

3. The conveyor mechanism defined in claim 2 wherein the driving force of said beams is the frictional engagement between the upper surface of said beam slotted portions and the peripheral surfaces of said associated shafts.

4. The conveyor mechanism defined in claim 2 wherein the driving force of said beams comprises: a gear rack formed on said upper surface of each of said beam slotted portions; and gear teeth formed about a portion of the outer periphery of each of said associated shafts, said shaft gear teeth engaging said beam gear rack to drive said beams in said first direction as said shafts rotate.

5. The conveyor mechanism as defined in claim 2 wherein said means engaging and supporting said beams to prevent contact between said beams and said rotating shafts comprises: a plurality of longitudinally spaced, parallel rollers carried by said support and spaced below said movable beams, said beams having a lower roller engaging surface adapted to engage and be supported by said rollers when said beams are displaced vertically downwardly, said lower roller engaging surfaces of said beams being disengaged from said rollers when said upper surfaces of said beam slotted portions are engaged by the periphery of their associated shafts, the distance between the lower roller engaging surface of said beams and said rollers when said beams are engaged by the outer periphery of said associated shafts being less than said predetermined depth of said shaft slots.

6. The conveyor mechanism defined in claim 5 wherein said means for moving said beams in a direction opposite to said first direction to said initial position when said beams are in said slots comprises: at least one springs carried by said movable beams and said support, said springs biasing said movable beams in said opposite direction.

7. The conveyor mechanism defined in claim 5 further comprising means for rotating said rollers in a direction opposite to the direction of rotation of said shafts, said means for moving said beams in a direction opposite to said first direction comprising the frictional engagement between said rotating rollers and said lower roller engaging surfaces of said beams when said last mentioned surfaces are engaged with said rotating rollers.

8. The conveyor mechanism defined in claim 5 including a gear rack formed on said lower roller engaging surfaces of said beams; gear teeth formed around the periphery of said rollers at the points of engagement between said lower roller engaging surfaces and said rollers; and means for rotating said rollers in a direction opposite to the direction said shafts rotate, whereby the gears on said rollers engage the said gear rack on said beams to drive said beams in said opposite direction to said initial position when said beams are displaced vertically downwardly.

9. The conveyor mechanism defined in claim 1 wherein the driving force of said beams is the frictional engagement between said beam portions and the outer periphery of their associated shafts.

10. The conveyor mechanism defined in claim 1 wherein the driving force of said beams comprises: a gear rack formed on each of said beam portions; and gear teeth formed about the outer periphery of each of said associated shafts, said shaft gear teeth engaging said beam gear racks to drive said beams in said first direction as said shafts rotate.

11. The conveyor mechanism defined in claim 1 including four transversely spaced, movable support beams, said shaft slots being so arranged about the periphery of said shafts as to alternately raise two of said movable beams and move said two movable beams in said first direction while returning the other of said movable beams to said initial position.

12. The conveyor mechanism defined in claim 11 wherein said two movable beams are disposed between the other of said movable beams.

13. The conveyor mechanism defined in claim 11 wherein each of said beams has a slotted portion associated with each shaft through which each shaft extends, said beam slotted portions being of a predetermined longitudinal length and of a width greater than the diameter of its associated shaft, each of said beam slotted portions having an upper surface disposed in a horizontal plane and longitudinally aligned with the shaft slots of its associated shaft, said horizontal upper surfaces being engaged by the outer periphery of said associated shafts to elevate said beams into engagement with said article and move said beams in said first direction.

14. The conveyor mechanism defined in claim 13 wherein the driving force of said beams is in frictional engagement between the upper surfaces of said beam slotted portions and the outer periphery of said associated shafts.

15. The conveyor mechanism defined in claim 13 wherein the driving force of said beams comprises: a gear rack formed on said upper surface of each of said beam slotted portions; and gear teeth formed about the outer periphery of each of said associated shafts, said shaft gear teeth engaging said beam gear racks to drive said beams in said first direction as said shafts rotate.

16. The conveyor mechanism defined in claim 13 wherein said means engaging and supporting said beams to prevent contact between said beams and said rotating shafts comprises: a plurality of longitudinally spaced, parallel rollers carried by said support and spaced below said movable beams, said beams having a lower roller engaging surface adapted to engage said rollers when said beams are displaced downwardly, said lower roller engaging surfaces of said beams being disengaged from said rollers when said upper surfaces of said beam slotted portions are engaged by the periphery of their associated shafts, the distance between the lower roller engaging surface being less than said predetermined depth of said shaft slots.

17. The conveyor mechanism defined in claim 16 wherein said means for moving said beams in a direction opposite to said first direction when said beams are in said shaft slots comprises: at least one springs carried by said movable beams and said support, said springs biasing said movable beams in said opposite direction.

18. The conveyor mechanism defined in claim 16 including means for rotating said rollers in a direction opposite to the direction of rotation of said shaft; said means for moving said beams in a direction opposite to said first direction comprises: the frictional engagement between said rotating rollers and said lower roller engaging surfaces of said movable beams when said last mentioned surfaces are engaged and supported with said rotating rollers.

19. The conveyor mechanism defined in claim 16 including a gear rack formed on said lower roller engaging surfaces of said beams; gear teeth formed around the periphery of said rollers at the points of engagement between said lower roller engaging surfaces and said rollers; and means for rotating said rollers in a direction opposite to the direction said shafts rotate, whereby the gears on said rollers engage said gear racks on said beams to drive said beams in said opposite direction when said beams are displaced downwardly.

20. The conveyor mechanism defined in claim 1 including three transversely spaced, movable support beams said shaft slots being so arranged as to alternately raise two of said beams to engage said article and move said article in said first direction, while the other of said beams is moved in said opposite direction.

21. The conveyor mechanism defined in claim 20 wherein said other movable beam is disposed between said two movable support beams.

22. The conveyor mechanism defined in claim 20 wherein each of said beams has a slotted portion associated with each shaft through which each shaft extends, said beam slotted portions being a predetermined longitudinal length and of a width greater than the diameter of its associated shaft, each of said beam slotted portions having an upper surface disposed in a horizontal plane and longitudinally aligned with said shaft slots, said horizontal upper surfaces being engaged by the outer periphery of its associated shaft to elevate said beams into engagement with said article and to move said beams in said first direction.

23. The conveyor mechanism defined in claim 22 wherein the driving force of said beams is the frictional engagement between the upper surface of said beam slotted portions and the outer surface of said associated shaft.

24. The conveyor mechanism defined in claim 22 wherein said means engaging said beams to prevent contact of said beams and said rotating shafts comprises: a plurality of longitudinally spaced, parallel rollers carried by said support and spaced below said movable beams, said beams having lower roller engaging surfaces adapted to engage and be supported by said rollers when said beams are displaced downwardly, said lower roller engaging surfaces being disengaged from said rollers when said upper surfaces of said beam slotted portions are engaged by the periphery of said associated shafts, the distance between the lower roller engaging surfaces of said beams and said rollers when said beams are engaged by said outer periphery of said associated shafts being less than said predetermined depth of said shaft slots.

25. The conveyor mechanism defined in claim 24 wherein said means for moving said beam in a direction opposite to said first direction when said beams are in said shaft slots comprises: a plurality of lightweight mechanical springs carried by said movable beams and said support, said springs biasing said movable beams in said opposite direction.

* * * * *